US010483824B2

(12) United States Patent
Jarr et al.

(10) Patent No.: US 10,483,824 B2
(45) Date of Patent: Nov. 19, 2019

(54) SELF-RELEASING LOCK MECHANISM

(71) Applicants:Christopher R. Jarr, Arlington Heights, IL (US); Steven E. Rickenbrode, Elmhurst, IL (US)

(72) Inventors: Christopher R. Jarr, Arlington Heights, IL (US); Steven E. Rickenbrode, Elmhurst, IL (US)

(73) Assignee: Woodward, Inc., Fort Collins, CO (US)

( * ) Notice: Subject to any disclaimer, the term of this patent is extended or adjusted under 35 U.S.C. 154(b) by 252 days.

(21) Appl. No.: 15/592,826

(22) Filed: May 11, 2017

(65) Prior Publication Data
US 2018/0331595 A1 Nov. 15, 2018

(51) Int. Cl.
| | |
|---|---|
| *H02K 7/00* | (2006.01) |
| *G05G 5/05* | (2006.01) |
| *G05G 5/06* | (2006.01) |
| *H02K 5/22* | (2006.01) |
| *H02K 7/08* | (2006.01) |
| *B60K 7/00* | (2006.01) |

(52) U.S. Cl.
CPC ........... *H02K 7/003* (2013.01); *B60K 7/0007* (2013.01); *G05G 5/05* (2013.01); *G05G 5/06* (2013.01); *H02K 5/225* (2013.01); *H02K 7/08* (2013.01)

(58) Field of Classification Search
CPC .......... H02K 7/003; H02K 5/225; H02K 7/08; B60K 7/0007; G05G 5/05; G05G 5/06; G05G 5/065
See application file for complete search history.

(56) References Cited

U.S. PATENT DOCUMENTS

| | | | |
|---|---|---|---|
| 4,014,193 A | 3/1977 | Carter | |
| 4,685,550 A * | 8/1987 | Metcalf | F16D 27/118 192/101 |
| 2007/0289834 A1 | 12/2007 | Razzacki | |
| 2012/0019050 A1 | 1/2012 | Feusse | |

FOREIGN PATENT DOCUMENTS

| | | |
|---|---|---|
| DE | 10 2012 000987 A1 | 7/2013 |
| DE | 10 2013 200460 A1 | 7/2014 |

\* cited by examiner

*Primary Examiner* — Thomas C Diaz
(74) *Attorney, Agent, or Firm* — Reinhart Boerner Van Deuren P.C.

(57) ABSTRACT

A self-releasing lock mechanism is provided and is configured to lock a driveshaft that is in mechanical communication with a rotor to mechanical ground via a flange in a motor housing. The self-releasing lock mechanism includes a ground lock housing having a locking arrangement configured to selectively engage a second end of the rotor. Locking pins extend from the ground lock housing and are configured to pass through the flange region of the motor housing. A locking plate includes the driveshaft and locking sites that are adapted to selectively receive the locking pins. A biasing member is disposed between the ground lock housing and the flange region to bias the ground lock housing away from the flange region. The locking arrangement engages the second end of the rotor to overcome the bias from the biasing member when the locking pins are received in locking sites.

20 Claims, 4 Drawing Sheets

# SELF-RELEASING LOCK MECHANISM

FIELD OF THE INVENTION

This invention generally relates to locking mechanisms and, more particularly, to a mechanical, self-releasing lock mechanism.

BACKGROUND OF THE INVENTION

In a variety of applications, a drive actuator can be used to position or orient such items as a propulsion system, a camera, a satellite, or a telescope. From time to time, the object being positioned by the drive actuator may need to undergo maintenance. In such situations, maintenance is made easier for the technician by locking the drive actuator to prevent movement of the object.

In some conventional applications, a powered brake is provided to lock the drive actuator. As the name implies, the powered brake requires a power source, such as a battery for DC powered brakes. Generally, the power source is a separate power source from the primary power source used to drive the drive actuator. Accordingly, to lock the drive actuator during maintenance, the system has to be designed with a separate power source, which increases the cost of the system. Further, in some instances, the separate power source can be unreliable, such as a battery that is nearing its fully discharged state.

A further disadvantage of powered brakes is that they have to be disengaged when maintenance is complete. Otherwise, the drive actuator will not function properly, if at all. Attempts to address that problem often require special tooling, create potential sources of foreign object damage and misuse, or require increased motor power to compensate for the drag created by the powered brake.

Embodiments of the presently disclosed invention provide a locking mechanism that overcomes the disadvantages described above. In particular, embodiments of the locking mechanism described hereinbelow are self-releasing and do not require a separate power source. These and other advantages of the invention, as well as additional inventive features, will be apparent from the description of the invention provided herein.

BRIEF SUMMARY OF THE INVENTION

In one aspect, embodiments of a self-releasing lock mechanism are provided. The self-releasing lock mechanism is configured to lock a driveshaft to mechanical ground. The driveshaft is in mechanical communication with a first end of a rotor of a motor, and the motor is disposed in a motor housing. The motor housing has a flange region that is connected to mechanical ground. The self-releasing lock mechanism includes a ground lock housing that is configured to surround at least a portion of the motor housing and that includes a locking arrangement configured to selectively engage a second end of the rotor. The self-releasing lock mechanism also includes at least one locking pin that extends from the ground lock housing and that is configured to extend into and pass through the flange region of the motor housing. The self-releasing lock mechanism also includes a locking plate that includes the driveshaft and at least one locking site that is adapted to selectively receive the at least one locking pin. The self-releasing lock mechanism further includes a biasing member disposed between the ground lock housing and the flange region in which the biasing member biases the ground lock housing away from the flange region. The locking arrangement engages the second end of the rotor to overcome the bias from the biasing member when the at least one locking pin is received in the at least one locking site.

In embodiments of the self-releasing lock mechanism, the locking arrangement is a spring detent system including a first number of spring detents. Each of the first number of spring detents is adapted to be received into one of a second number of detent holes spaced around the second end of the rotor. In such embodiments, the second number of detent holes is preferably at least twice the first number of spring detents.

In other embodiments of the self-releasing lock mechanism, the locking plate further includes a lobed aperture so as to provide a high backlash joint between the first end of the rotor and the driveshaft. In such embodiments, the locking arrangement is a spring detent system comprising a first number of spring detents in which each of the first number of spring detents adapted to be received into one of a second number of detent holes spaced around the second end of the rotor. The second number of detent holes is preferably selected such that the spring detents engage the second end of the rotor within the backlash provided by the high backlash joint.

Further, in embodiments, the self-releasing lock mechanism has at least three locking pins. In such cases, preferably the at least one locking site is at least twice the number of the at least three locking pins. Additionally, the biasing member of the self-releasing lock mechanism is one or more compression springs, and each of the at least one locking pin is surrounded by a compression spring in a region of the at least one locking pin between a bottom of the ground lock housing and the flange region of the motor housing.

In another aspect, embodiments of a method of locking rotation of a driveshaft to mechanical ground are provided. The driveshaft is in mechanical communication with a first end of a rotor of a motor, and the motor is disposed in a motor housing that is connected to mechanical ground. Further, the motor housing is surrounded by a ground lock housing in which one or more locking pins are adapted to engage one or more locking sites of a locking plate. The ground lock housing has a locking arrangement adapted to engage a second end of a rotor. The method includes the steps of forcing the ground lock housing towards the locking plate and rotating the ground lock housing in a first direction so as to align each of the one or more locking pins with a respective locking site while continuing to force the ground lock housing towards the locking plate such that the one or more locking pins engage a respective locking site. The method also includes the step of rotating the ground lock housing in a second direction so as to cause the locking arrangement to engage the second end of the rotor.

In certain embodiments, forcing the ground lock housing towards the locking plate further includes applying a force sufficient to overcome a biasing force pushing the ground lock housing away from the locking plate. In such embodiments, the step of rotating the ground lock housing a second direction further includes engaging the second end of the rotor in such a manner as to maintain a position of the ground lock housing against the biasing force.

Further, in embodiments, the method also includes the step of releasing the driveshaft from mechanical ground when the motor drives rotation of the rotor such that the rotation of the rotor causes the locking arrangement to disengage from the rotor. Additionally, the steps of rotating the ground lock housing a first direction and rotating the ground lock housing a second direction further include using a high backlash joint such that the step of rotating the ground lock housing in a second direction is accomplished within the backlash provided by the high backlash joint.

In still another aspect, embodiments of a device with a self-releasing lock mechanism are provided. The device includes a motor having a stator and a rotor and a motor housing. The stator is disposed within the motor housing. A first end of the rotor extends out of a first side of the motor housing, and a second end of the rotor extends out of a second side of the motor housing that is opposite to the first side. The motor housing includes a flange region connected to mechanical ground. The device also includes a ground lock housing including one or more locking pins and a locking arrangement. The ground lock housing surrounds at least a portion of the motor housing. The locking arrangement is configured to engage the first end of the rotor, and the locking pins are adapted to extend into and through the flange region. The device further includes a biasing member disposed between the ground lock housing and the flange region, and the biasing member biases the ground lock housing away from the flange region. Still further the device includes a locking plate comprising a driveshaft and a plurality of locking sites. The driveshaft is in mechanical communication with the second end of the rotor, and each of the plurality of locking sites are adapted to receive one of the one or more locking pins. The locking arrangement engages the first end of the rotor to hold the ground lock housing in a position in which each of the one or more locking pins is inserted into one of the plurality of locking sites.

In embodiments of the device, the locking arrangement is a spring detent system that includes a first number of spring detents adapted to be received into one of a second number of detent holes spaced around the first end of the rotor. Preferably, the second number of detent holes is at least twice the first number of spring detents. In other embodiments of the device, the locking plate further includes a lobed aperture so as to provide a high backlash joint between the second end of the rotor and the driveshaft. In such embodiments, the locking arrangement is a spring detent system including a first number of spring detents that are adapted to be received into one of a second number of detent holes spaced around the first end of the rotor, and the second number of detent holes is selected such that the spring detents can engage the second end of the rotor within the backlash provided by the high backlash joint. In still other embodiments of the device, the biasing member is one or more compression springs.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of a self-releasing lock mechanism are provided herein. In general, the self-releasing lock mechanism locks the rotor of a motor to mechanical ground so that, for instance, maintenance can be performed on an object moved or driven by the motor. One advantage of certain embodiments of the disclosed self-releasing lock mechanism is that the self-releasing lock mechanism will disengage itself when the motor is driven by the operator (i.e., "set and forget" functionality). As such, the self-releasing lock mechanism overcomes many of the aforementioned disadvantages with prior powered brake systems. While a person having ordinary skill in the art will appreciate from this disclosure that embodiments of the self-releasing lock mechanism are broadly applicable, exemplary embodiments and context for use of the invention will be discussed in relation to a drive actuator. However, that discussion is for the exemplary purposes only and should not be read as excluding the use of the self-releasing lock mechanism in other applications or contexts.

Figure 1:
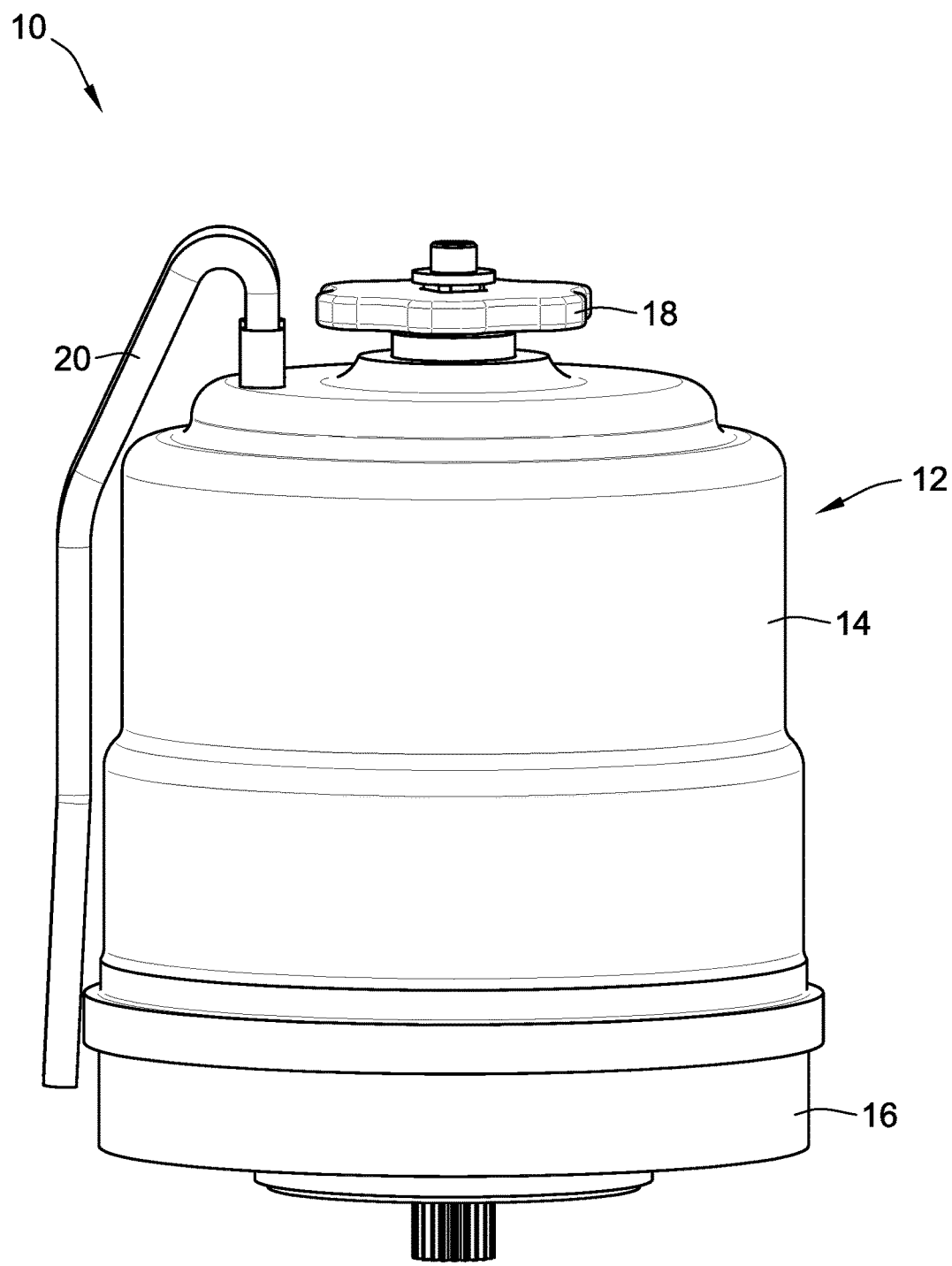
FIG. 1 is an isometric view of a self-releasing lock mechanism according to an exemplary embodiment.

FIG. 1 depicts an embodiment of the self-releasing lock mechanism 10. As shown in FIG. 1, the self-releasing lock mechanism 10 includes an outer housing 12, including an upper housing portion 14 and a lower housing portion 16. In the depicted embodiment, the housing 12 is in two parts to facilitate assembly of the self-releasing lock mechanism, but in other embodiments, the housing 12 can be a single-piece construction. Located at the top end (with respect to the orientation of FIG. 1) of the upper housing portion 14 is a knob 18. As will be discussed in more detail below, the knob 18 is manipulated by a user to engage and disengage the self-releasing lock mechanism 10. As can also be seen from FIG. 1, cables 20 are inserted through the top of the housing 12 to provide power to a motor 22, which is depicted in FIG. 2.

Figure 2:
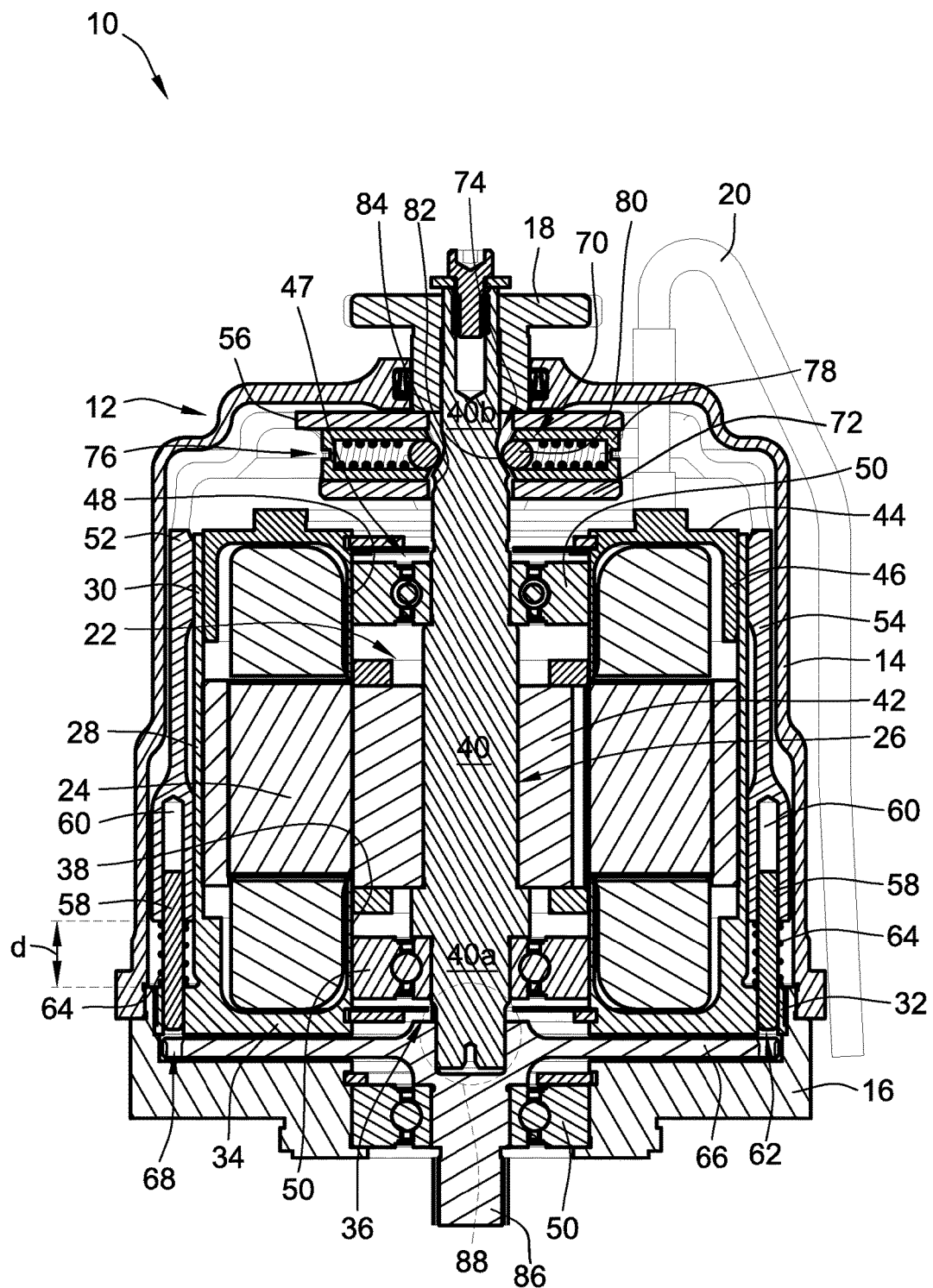
FIG. 2 is a cross-sectional view of the self-releasing lock mechanism of FIG. 1 in the disengaged position according to an exemplary embodiment.

FIG. 2 provides a cross-sectional view of the self-releasing lock mechanism 10. As mentioned above, the interior of the housing 12 contains the motor 22, which is comprised of a stator 24 and a rotor 26. The stator 24 is contained within a motor housing 28. As depicted in FIG. 2, the motor housing 28 has a substantially tubular outer wall 30 and a flange region 32 disposed at the lower end (with respect to the orientation of FIG. 2). The motor housing 28 also includes a bottom panel 34 that defines a central aperture 36. Extending upwardly from the bottom panel 34 and having the same diameter as the central aperture 36 is a substantially tubular inner wall 38. The stator 24 is positioned between the outer wall 30 and the inner wall 38, and the stator 24 is proximal to the bottom panel 34.

A substantial portion of the rotor 26 is also contained within the motor housing 28. The rotor 26 includes a rotor shaft 40 and a rotor collar 42 (e.g., magnetic teeth or windings depending on the type of motor 22). The rotor shaft 40 extends through the motor housing 28, and a first end 40a of the rotor shaft 40 extends out of the central aperture 36.

The rotor 26 is positioned such that the rotor collar 42 is concentric with the stator 24. A motor housing cap 44 is placed on the end of the motor housing 28 opposite the bottom panel 34. As depicted in FIG. 2, the motor housing cap 44 includes a peripheral wall 46 that is adapted to frictionally engage the interior of the outer wall 30 of the motor housing 28. As with the bottom panel 34, the motor housing cap 44 defines a central aperture 47, and a tubular interior wall 48, having the same diameter as the central aperture 46, extends from the motor housing cap 44. A second end 40b of the rotor shaft 40 extends through the central aperture 47 of the motor housing cap 44. One or more bearings 50 can be placed within the inner wall 38 of the motor housing 28 and within the interior wall 48 of the motor housing cap 44 to position the rotor 26 within the motor housing 28 and to facilitate smooth rotation of the rotor 26 when the motor 22 is operational.

Surrounding the motor housing 28 is a ground lock housing 52. The ground lock housing 52 includes a tubular wall portion 54 with an upper panel 56. The tubular wall portion 54 is slidable over the motor housing 28. The ground lock housing 52 includes at least one locking pin 58. In the cross-sectional view of FIG. 2, two locking pins 58 are shown; although, the embodiment includes four, equidistantly spaced locking pins 58. The locking pins 58 extend from the bottom (with respect to the orientation of FIG. 2) of the tubular wall portion 54. That is, the locking pins 58 extend from the thickness of the tubular wall portion 54 in the embodiment provided in the figures. Thus, as shown in FIG. 2, the tubular wall portion 54 includes bores 60 into which the locking pins 58 are fitted. However, in other embodiments, the locking pins 58 can be integrally formed with the ground lock housing 52, and in still other embodiments, the locking pins 58 can formed or attached to the inner or outer surface of the tubular wall portion 54 instead of in the thickness.

The flange region 32 of the motor housing 28 includes a number of pinholes 62 equal to the number of locking pins 58. The pinholes 62 are adapted to receive the locking pins 58 such that the locking pins 58 can extend into and through the flange region 32. The flange region 32 and the bottom of the ground lock housing 52 are separated by a distance d. When the self-releasing locking mechanism 10 is not engaged, the distance d is maintained with a biasing member. For example, as shown in FIG. 2, the distance d creates a central region of the locking pins 58 that is not inserted into the bores 60 of the ground lock housing 52 or into the pinholes 62 of the flange region 32. Biasing members, e.g., compression springs 64, surround this central region of the pinholes 62 and maintain the distance d between the ground lock housing 52 and the flange region 32. That is, the bottom of the ground lock housing 52 is biased away from the flange region 32. Preferably, the distance d is such that the locking pins 58 are flush with or, at least, do not extend past the bottom of the flange region 32.

To engage the self-releasing lock mechanism 10, a downward pressure (with respect to the orientation depicted in FIG. 2) is applied to the ground lock housing 52 via the knob 18. As shown in FIG. 2, the knob 18 abuts the upper panel 56 of the ground lock housing 52 such that downward pressure on the knob 18 is transferred to the ground lock housing 52. In embodiments, because the rotor 26 is fixed in its vertical position by the motor housing 28 and motor housing cap 44, the knob 18 slides along the second end 40b of the rotor shaft 40 when the downward pressure is applied. The downward pressure causes the locking pins 58 to extend through the flange region 32 into a locking plate 66. Particularly, the locking plate 66 includes a plurality of locking sites 68, which are holes formed into or through the locking plate 66 adapted to receive the locking pins 58. In embodiments, the locking sites 68 are countersunk so as to provide a tapered surface to guide the locking pins 58 into the locking sites 68. When downward pressure is applied on the ground lock housing 52, the springs 64 are compressed such that the distance d between the bottom of the ground lock housing 52 and the flange region 32 is decreased. Relaxation of the pressure on the knob 18 will cause the springs 64 to expand, thereby withdrawing the locking pins 58 from the locking plate 66. Thus, the self-releasing lock mechanism 10 is biased in the disengaged position.

In order to maintain the self-releasing lock mechanism 10 in the engaged position (i.e., with the locking pins 58 inserted into the locking plate 66), another locking arrangement is provided on the upper panel 56 of the ground lock housing 52. This locking arrangement is configured to engage the rotor 26. Specifically, a spring detent system 70 is formed or attached on the interior side of the upper panel 56 of the ground lock housing 52. The spring detent system 70 generally includes a circular disc 72, and a common, generally cylindrical passage 74 is formed through the upper panel 56 and the circular disc 72. The passage 74 is coaxial with the longitudinal axis of the rotor 26. The circular disc 72 has one or more radially extending channels 76 formed therein with an opening to the passage 74. Spring detents 78 are provided in each of the radially extending channels 76 with a detent ball 80 of each spring detent 78 protruding at least partially into the passage 74. The second end 40b of the rotor shaft 40 extends through the passage 74 and out of the upper panel 56 of the ground lock housing 52. The second end 40b of the rotor shaft 40 engages detent balls 80 of the spring detents 78.

Specifically, the second end 40b of the rotor shaft 40 is shaped so as engage the spring detents 78 in a locking fashion. The second end 40b includes a neck region 82 against which the detent balls 80 rest when the self-releasing lock mechanism 10 is not engaged. The neck region 82 facilitates depression of the detent balls 80 when downward pressure is applied to the ground lock housing 52. More particularly, as the ground lock housing 52 moves downwardly the detent balls 80 slide along the surface of the neck region 82, and as the neck region 82 widens, the detent balls 80 depress further. Below the neck region 82 are a series of detent holes 84 disposed around the periphery of the second end 40b of the rotor shaft 40. When the depressed detent balls 80 reach the detent holes 84, the detent balls 80 will extend into the detent holes 84, thereby locking into the rotor shaft 40. In this way, the vertical position of the ground lock housing 52 is locked against the rotor shaft 40, i.e., the spring detent system 70 locks the ground lock housing 52 in place against the biasing action of the compression springs 64.

Thus, the rotor 26 is locked to the ground lock housing 52 via the spring detent system, while at the same time the ground lock housing 52 is locked in the engaged position in which the locking pins 58 are inserted through the flange region 32 of the motor housing 28 into the locking plate 66. The ground lock housing 52 is able to mechanically ground the rotor 26 of the motor 22 because the motor housing 28 is mechanically grounded to the lower housing portion 16 (via the locking pins 58 extending through the flange region 32).

When the motor 22 is in operation, the energization of the stator 24 causes rotation of the rotor 26. The first end 40a of the rotor shaft 40 is mechanically linked to the locking plate 66. As can be seen in FIG. 2, a driveshaft 86 extends from the lower surface of the locking plate 66. The driveshaft 86 translates the rotation of the rotor 26 to the downstream mechanical connections, such as a drive actuator. The mechanical linkage between the rotor 26 and the locking plate 66 is a high backlash joint 88.

Figure 3:
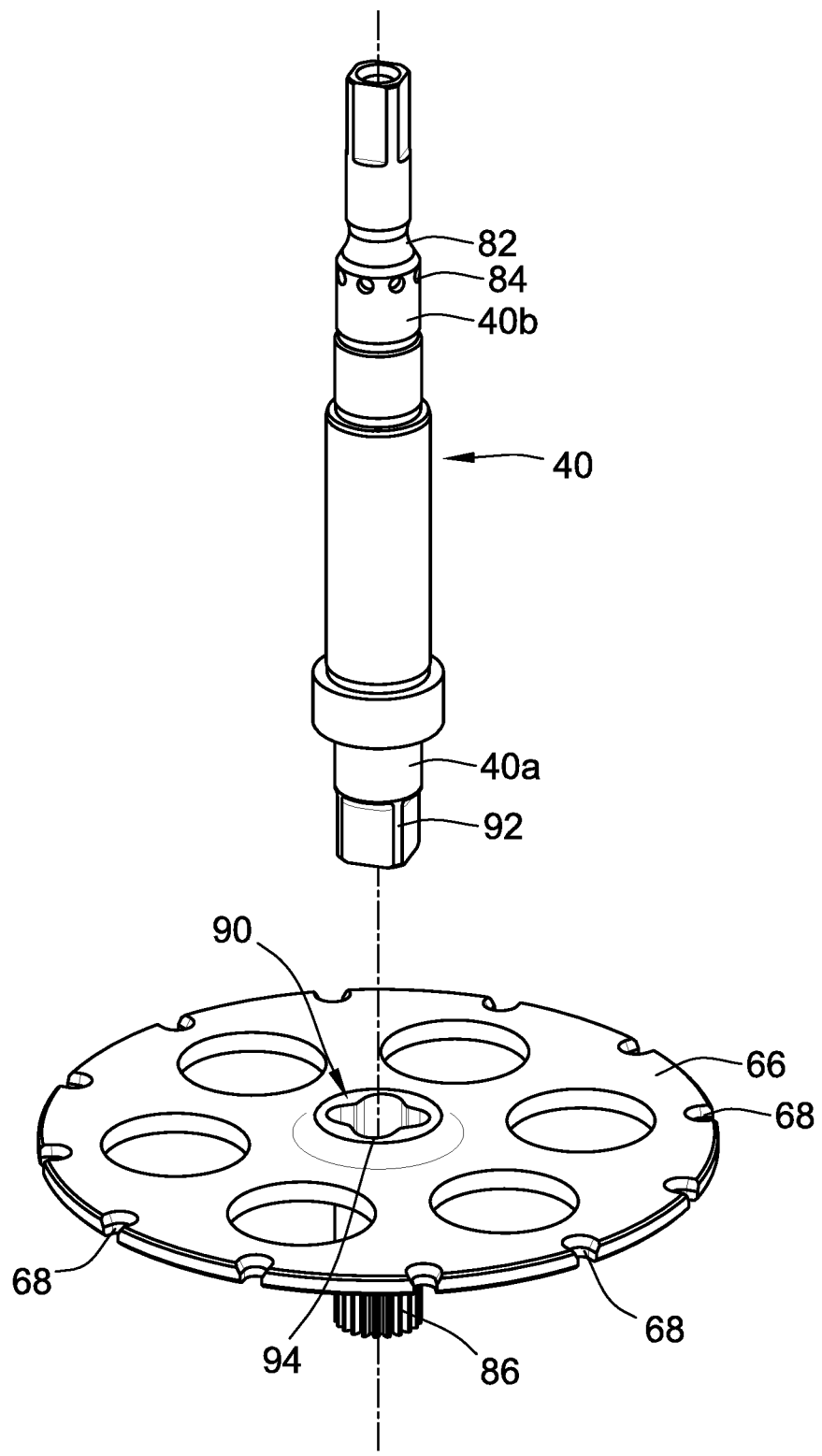
FIG. 3 depicts the rotor shaft and locking plate of the self-releasing lock mechanism according to an exemplary embodiment.

In particular, the components of high backlash joint 88 shown in FIG. 2 are shown in greater detail in FIG. 3. As depicted in FIG. 3, a lobed aperture 90 is defined in the locking plate 66, and one or more splines 92 are formed on the first end 40a of the rotor shaft 40. The first end 40a of the rotor shaft 40 extends into the lobed aperture 90 of the locking plate 66. Each spline 92 is received into a lobe 94 of the lobed aperture 90. The rotor shaft 40 is able to rotate within the lobed aperture 90 without driving rotation of the locking plate 66 over an arcuate distance corresponding to the splines 92 traveling from one side of the lobes 94 to the other side of the lobes 94.

Figure 4:
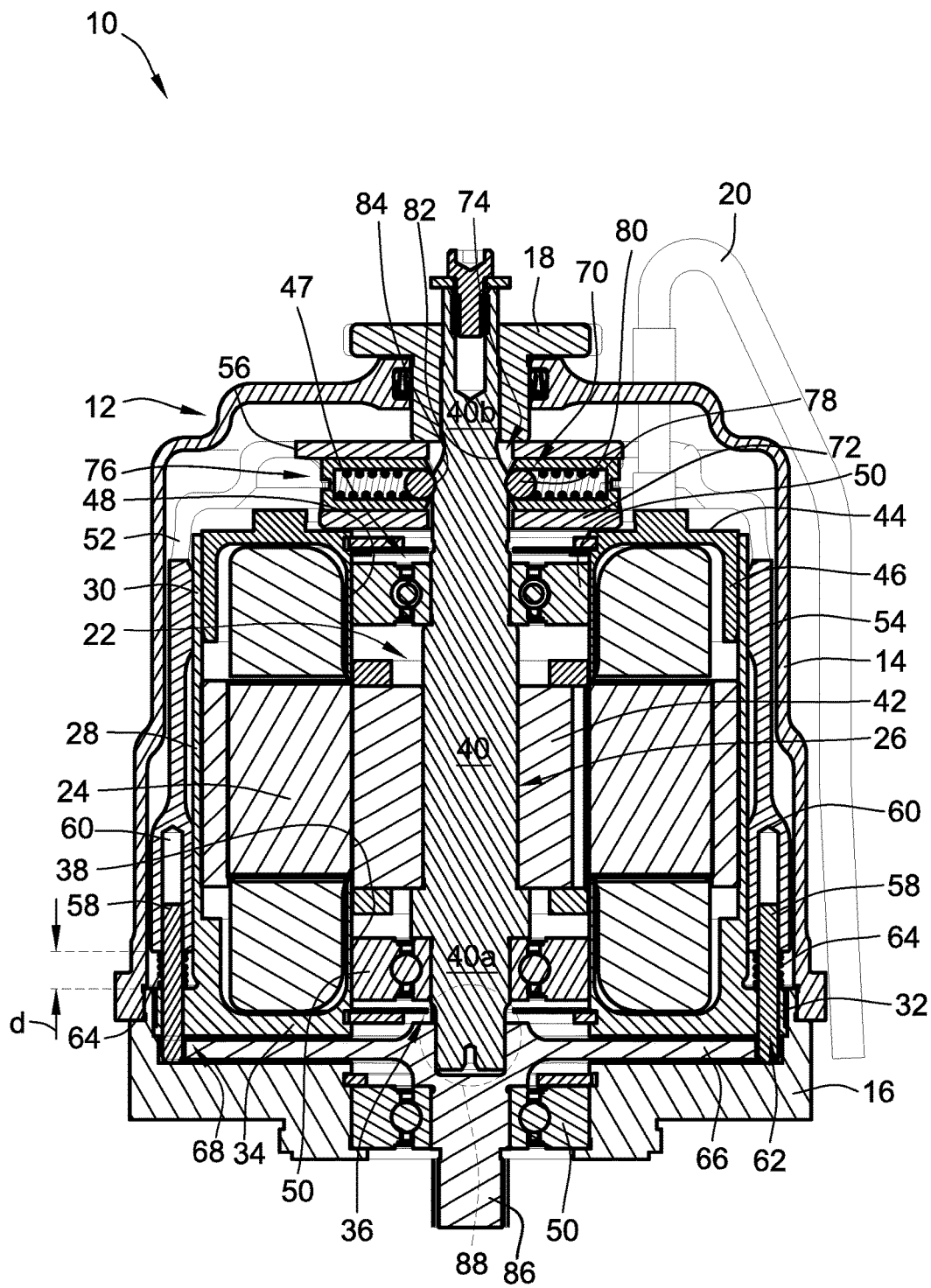
FIG. 4 is a cross-sectional view of the self-releasing lock mechanism of FIG. 1 in the engaged position according to an exemplary embodiment.

The high backlash joint 88 helps facilitate locking and unlocking of the self-releasing lock mechanism 10. As shown in FIG. 4, the self-releasing lock mechanism 10 is engaged, i.e., the locking pins 58 are inserted into the locking sites 68 of the locking plate 66 and the spring detent system 70 has engaged the detent holes 84 of the rotor shaft 40. In order to reach the engaged configuration, the locking pins 58 need to align with the locking sites 68 of the locking plate 66 such that the locking pins 58 can be inserted into the locking sites 68 as illustrated in FIG. 4. However, rotation of the rotor 26 when the motor 22 is driven causes rotation of the locking plate 66 via the engagement of the rotor splines 92 with the lobed aperture 90 of the locking plate 66 (as shown in FIG. 3). Because the ground lock housing 52 is fixed to mechanical ground, the ground lock housing 52 and, consequently, the locking pins 58 remain stationary. As such, when the motor 22 is stopped, the locking pins 58 and locking sites 68 may not align such that the ground lock housing 52 can be pushed downwardly (with respect to the orientation of FIG. 4) to engage the locking plate 66.

In order to address this potential misalignment, the knob 18 is connected to the rotor 26 so that a user can rotate the knob 18, and consequently the rotor 26, to align the locking sites 68 of the locking plate 66 with the locking pins 58. Thus, the user applies a downward pressure on the knob 18, which applies downward pressure on the ground locking housing 52, while rotating the knob 18 a first direction, which causes the locking plate 66 to rotate such that the locking sites 68 are align with the locking pins 58.

When the user feels the locking pins 58 slide into the locking sites 68, the user then rotates the knob 18 the opposite direction while continuing to provide downward pressure. Because of the high backlash joint 88, the rotor spline 92 can move within the lobe 94 so that the rotor 26 can be rotated to align the spring detents 78 with the detent holes 84 of the rotor shaft 40. When the user senses the spring detents 78 engage the detent holes 84 (e.g., audible click or tactile feedback), the user stops rotating the knob 18. As discussed above, this causes the ground lock housing 52 to be locked in the engaged position by the spring detent system 70. To facilitate engaging the self-releasing lock mechanism 10, more locking sites 68 and detent holes 84 are provided than the corresponding locking pins 58 and spring detents 78. For example, in an embodiment with four locking pins 58, eight, twelve, or sixteen locking sites 68 can be provided around the periphery of the locking plate 66 so that the rotor 26 does not have to rotate as far for the locking pins 58 to find a locking site. Similarly for an exemplary embodiment with four spring detents 78, eight or twelve detent holes 84 can be provide around the rotor shaft 40. Specifically, in preferred embodiments, the detent holes 84 are spaced around the rotor shaft 40 at a distance that allows them to engage the spring detents 78 within the backlash between the rotor splines 92 and the lobes 94.

In the exemplary embodiment of a drive actuator, the driveshaft 86 controls movement of an object, such as a scope or camera, connected to the drive actuator. Once the driveshaft 86 is mechanically grounded via manipulation of the push-turn knob 18, maintenance can be performed on the object driven by the drive actuator, while reducing the risk that the object will be damaged or that the technician will be injured by slip of the object.

The self-releasing lock mechanism 10 can be disabled by rotating the push-turn knob 18 in the opposite direction as the direction of rotation used to engage the spring detents 78 with the detent holes 84. This rotation causes the detent balls 80 to slide out of the detent hole 84, thereby releasing the ground lock housing 52 from being held in the downward position by the spring detent system 70. The biasing member, e.g., compressing springs 64, then moves the ground locking housing 52 upwardly, thereby withdrawing the locking pins 58 from the locking sites 68. Accordingly, the rotor 26 is no longer mechanically grounded.

However, the self-releasing lock mechanism 10 can also be disengaged simply by driving the motor 22. In particular, the high backlash joint 88 enables release of the ground lock automatically when the motor 22 is driven. Driving the motor 22 causes rotation of the rotor 26, and the high backlash joint 88 allows the rotor spline 92 to move within the lobe 94 of the lobed aperture 90, thereby causing the spring detents 78 to slide out of the detent holes 84. As discussed above, the spring detent system 70 locks the ground lock housing 52 in the engaged position against the upward bias of the compression springs 64. Thus, uncoupling the ground lock housing 52 from the rotor 26 will cause the ground lock housing 52 to move upward, disengaging the locking pins 58 from the locking plate 66. Accordingly, the driveshaft 86 is no longer locked to mechanical ground, and the motor 22 operates normally. In this way, the operator will not experience diminished control capabilities typical to those experienced in systems using powered brake locks such as when the technician forgets to disengage the powered brake locks after servicing the drive actuator.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self-releasing lock mechanism configured to lock a driveshaft to mechanical ground, the driveshaft being in mechanical communication with a first end of a rotor of a motor, the motor being disposed in a motor housing having a flange region that is connected to mechanical ground, the self-releasing lock mechanism comprising:
   a ground lock housing, the ground lock housing configured to surround at least a portion of the motor housing and the ground lock housing including a locking arrangement configured to selectively engage a second end of the rotor;
   at least one locking pin that extends from the ground lock housing, the at least one locking pin configured to extend into and pass through the flange region of the motor housing;
   a locking plate comprising the driveshaft and at least one locking site, the at least one locking site adapted to selectively receive the at least one locking pin; and
   a biasing member disposed between the ground lock housing and the flange region;
   wherein the biasing member biases the ground lock housing away from the flange region;
   wherein the locking arrangement engages the second end of the rotor to overcome the bias from the biasing member when the at least one locking pin is received in the at least one locking site.

2. The self-releasing lock mechanism of claim 1, wherein the locking arrangement is a spring detent system comprising a first number of spring detents, each of the first number of spring detents adapted to be received into one of a second number of detent holes spaced around the second end of the rotor.

3. The self-releasing locking mechanism of claim 2, wherein the second number of detent holes is at least twice the first number of spring detents.

4. The self-releasing lock mechanism of claim 1, wherein the locking plate further comprises a lobed aperture so as to provide a high backlash joint between the first end of the rotor and the driveshaft.

5. The self-releasing lock mechanism of claim 4, wherein the locking arrangement is a spring detent system comprising a first number of spring detents, each of the first number of spring detents adapted to be received into one of a second number of detent holes spaced around the second end of the rotor; and
   wherein the second number of detent holes is selected such that the spring detents can engage the second end of the rotor within the backlash provided by the high backlash joint.

6. The self-releasing lock mechanism of claim 1, wherein the at least one locking pin is at least three locking pins.

7. The self-releasing lock mechanism of claim 6, wherein the at least one locking site is at least twice the number of the at least three locking pins.

8. The self-releasing lock mechanism of claim 1, wherein the biasing member is one or more compression springs.

9. The self-releasing lock mechanism of claim 8, wherein each of the at least one locking pin is surrounded by a compression spring in a region of the at least one locking pin between a bottom of the ground lock housing and the flange region of the motor housing.

10. A method of locking rotation of a driveshaft to mechanical ground, wherein the driveshaft is in mechanical communication with a first end of a rotor of a motor, wherein the motor is disposed in a motor housing that is connected to mechanical ground, wherein the motor housing is surrounded by a ground lock housing, wherein the ground lock housing has one or more locking pins adapted to engage one or more locking sites of a locking plate, and wherein the ground lock housing has a locking arrangement adapted to engage a second end of a rotor, the method comprising the steps of:
   forcing the ground lock housing towards the locking plate;
   rotating the ground lock housing in a first direction so as to align each of the one or more locking pins with a respective locking site while continuing to force the ground lock housing towards the locking plate such that the one or more locking pins engage a respective locking site; and
   rotating the ground lock housing in a second direction so as to cause the locking arrangement to engage the second end of the rotor.

11. The method of claim 10, wherein forcing the ground lock housing towards the locking plate further comprises applying a force sufficient to overcome a biasing force pushing the ground lock housing away from the locking plate.

12. The method of claim 11, wherein the step of rotating the ground lock housing in a second direction further comprises engaging the second end of the rotor in such a manner as to maintain a position of the ground lock housing against the biasing force.

13. The method of claim 10, further comprising the step of releasing the driveshaft from mechanical ground when the motor drives rotation of the rotor such that the rotation of the rotor causes the locking arrangement to disengage from the rotor.

14. The method of claim 10, wherein the steps of rotating the ground lock housing in a first direction and rotating the ground lock housing in a second direction further comprise using a high backlash joint such that the step of rotating the ground lock housing in a second direction is accomplished within the backlash provided by the high backlash joint.

15. A device with a self-releasing lock mechanism, comprising:
   a motor comprising a stator and a rotor;
   a motor housing, wherein the stator is disposed within the motor housing and wherein a first end of the rotor extends out of a first side of the motor housing and a second end of the rotor extends out of a second side of the motor housing that is opposite to the first side, and wherein the motor housing includes a flange region connected to mechanical ground;

a ground lock housing comprising one or more locking pins and a locking arrangement, wherein the ground lock housing surrounds at least a portion of the motor housing, wherein the locking arrangement is configured to engage the second end of the rotor, and wherein the locking pins are adapted to extend into and through the flange region;

a biasing member disposed between the ground lock housing and the flange region, wherein biasing member biases the ground lock housing away from the flange region; and a locking plate comprising a driveshaft and a plurality of locking sites, wherein the driveshaft is in mechanical communication with the first end of the rotor and wherein each of the plurality of locking sites are adapted to receive one of the one or more locking pins;

wherein the locking arrangement engages the second end of the rotor to hold the ground lock housing in a position in which each of the one or more locking pins is inserted into one of the plurality of locking sites.

16. The device of claim 15, wherein the locking arrangement is a spring detent system comprising a first number of spring detents, each of the first number of spring detents adapted to be received into one of a second number of detent holes spaced around the second end of the rotor.

17. The device of claim 16, wherein the second number of detent holes is at least twice the first number of spring detents.

18. The device of claim 15, wherein the locking plate further comprises a lobed aperture so as to provide a high backlash joint between the first end of the rotor and the driveshaft.

19. The device of claim 18, wherein the locking arrangement is a spring detent system comprising a first number of spring detents, each of the first number of spring detents adapted to be received into one of a second number of detent holes spaced around the second end of the rotor; and wherein the second number of detent holes is selected such that the spring detents can engage the second end of the rotor within the backlash provided by the high backlash joint.

20. The device of claim 15, wherein the biasing member is one or more compression springs.

* * * * *